United States Patent
Cheng et al.

(10) Patent No.: US 8,825,049 B2
(45) Date of Patent: Sep. 2, 2014

(54) METHODS AND SYSTEMS USING UNIFIED OPERATOR AND RAT MAPPING AND SELECTION SCHEME

(75) Inventors: Steven D. Cheng, San Diego, CA (US); Guangming Carl Shi, San Diego, CA (US); Kuo-Chun Lee, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 12/699,191

(22) Filed: Feb. 3, 2010

(65) Prior Publication Data

US 2010/0215026 A1  Aug. 26, 2010

Related U.S. Application Data

(60) Provisional application No. 61/155,516, filed on Feb. 26, 2009.

(51) Int. Cl.
 *H04W 4/00* (2009.01)
(52) U.S. Cl.
 USPC ............... 455/435.2; 455/435.3; 455/436; 455/437; 455/444; 370/338; 370/331; 370/334
(58) Field of Classification Search
 USPC .............. 455/435.2, 435.3, 436, 437, 444; 370/338, 331, 334
 See application file for complete search history.

(56) References Cited

U.S. PATENT DOCUMENTS

| 2007/0155420 | A1* | 7/2007 | Nagaraj et al. ............. 455/552.1 |
| 2009/0325575 | A1* | 12/2009 | Rantanen et al. ............. 455/433 |
| 2012/0113964 | A1* | 5/2012 | Petersen et al. ............... 370/338 |

FOREIGN PATENT DOCUMENTS

| EP | 1740001 | 1/2007 |
| EP | 1885141 | 2/2008 |
| WO | WO2007112139 | 10/2007 |

OTHER PUBLICATIONS

Etemad, K.: "Overview of Mobile WiMAX Technology and Evolution," IEEE Communications Magazine, vol. 46, No. 10, (Oct. 1, 2008), pp. 31-40, XP011236257, DOI: 10.1109/MCOM.2008.4644117.
International Search Report—PCT/US10/025066, International Search Authority—European Patent Office—May 17, 2010.
Written Opinion—PCT/US10/025066, International Search Authority—European Patent Office—May 17, 2010.
Taiwan Search Report—TW099105484—TIPO—Mar. 5, 2013.

\* cited by examiner

*Primary Examiner* — Justin Lee
(74) *Attorney, Agent, or Firm* — Linda G. Gunderson

(57) ABSTRACT

Certain embodiments of the present disclosure provide a unified scheme for selecting an operator and a radio access technology (RAT) by a multi-mode wireless device during a power-up or a handover process. By utilizing the proposed scheme, the mobile station may switch between RATs that are associated with the Worldwide Interoperability for Microwave Access (WiMAX), 3rd Generation Partnership Project (3GPP) or 3GPP2 standards.

19 Claims, 9 Drawing Sheets

METHODS AND SYSTEMS USING UNIFIED OPERATOR AND RAT MAPPING AND SELECTION SCHEME

CLAIM OF PRIORITY

This application claims the benefit of priority from U.S. Provisional Patent Application Ser. No. 61/155,516, entitled "Methods and Systems using Unified Operator and RAT Mapping and Selection Scheme" and filed Feb. 26, 2009, which is assigned to the assignee of this application and fully incorporated herein by reference for all purposes.

TECHNICAL FIELD

Certain embodiments of the present disclosure generally relate to wireless communications, and more particularly to selecting a radio access technology and an operator by a multi-mode wireless device.

BACKGROUND

Multi-mode wireless devices may support different radio access technologies (RATs). Such devices may support a system determination feature, which enables mobile users to specify priority and preference of different RATs, different operators, different service providers, and the like, during a system configuration process. Some long range wireless standards have standardized a system determination feature, providing mobile users with a unified approach to configure the related settings. Unfortunately, Worldwide Interoperability for Microwave Access (WiMAX), which is based upon the Institute of Electrical and Electronics Engineers (IEEE) standards, has not standardized a system determination feature yet.

Accordingly, certain challenges are presented when integrating WiMAX into other multi-mode solutions inside a multi-mode wireless device, for example a multi-mode mobile station, base station, handset, or the like.

SUMMARY

Certain embodiments provide a method for wireless communications by a multi-mode wireless device capable of communicating via a plurality of radio access technologies (RATs). The method generally includes identifying a first set of networks and their corresponding parameters, wherein the first set of networks comprises one or more networks that utilize a first RAT, translating one or more parameters of the first set of networks to one or more Network Access Provider (NAP) values of a second set of networks, wherein the second set of networks comprises another one or more networks that utilize a second RAT, selecting a network from the second set of networks based at least in part on a preference, and establishing a connection with the selected network.

Certain embodiments provide an apparatus for wireless communications by a multi-mode wireless device capable of communicating via a plurality of RATs. The apparatus generally includes means for identifying a first set of networks and their corresponding parameters, wherein the first set of networks comprises one or more networks that utilize a first RAT, means for translating one or more parameters of the first set of networks to one or more Network Access Provider (NAP) values of a second set of networks, wherein the second set of networks comprises another one or more networks that utilize a second RAT, means for selecting a network from the second set of networks based at least in part on a preference, and means for establishing a connection with the selected network.

Certain embodiments provide an apparatus for wireless communications by a multi-mode wireless device capable of communicating via a plurality of RATs. The apparatus generally includes logic for identifying a first set of networks and their corresponding parameters, wherein the first set of networks comprises one or more networks that utilize a first RAT, logic for translating one or more parameters of the first set of networks to one or more Network Access Provider (NAP) values of a second set of networks, wherein the second set of networks comprises another one or more networks that utilize a second RAT, logic for selecting a network from the second set of networks based at least in part on a preference, and logic for establishing a connection with the selected network.

Certain embodiments of the present disclosure provide a computer-program product for wireless communications by a multi-mode wireless device capable of communicating via a plurality of radio access technologies (RATs), comprising a memory device having instructions stored thereon, the instructions being executable by one or more processors. The instructions generally include instructions for identifying a first set of networks and their corresponding parameters, wherein the first set of networks comprises one or more networks that utilize a first RAT, instructions for translating one or more parameters of the first set of networks to one or more Network Access Provider (NAP) values of a second set of networks, wherein the second set of networks comprises another one or more networks that utilize a second RAT, instructions for selecting a network from the second set of networks based at least in part on a preference, and instructions for establishing a connection with the selected network.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
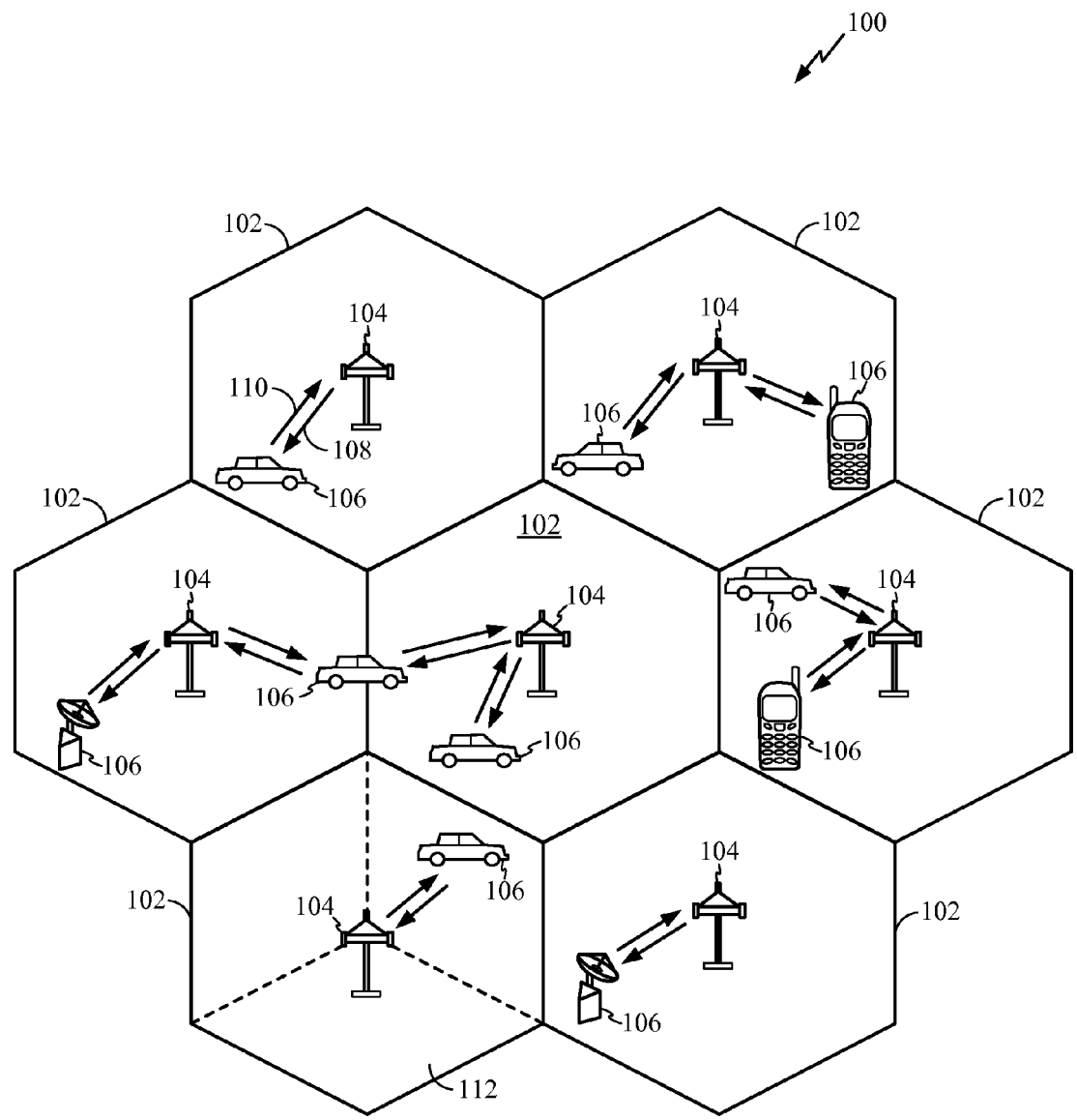
FIG. 1 illustrates an example wireless communication system, in accordance with certain embodiments of the present disclosure.

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
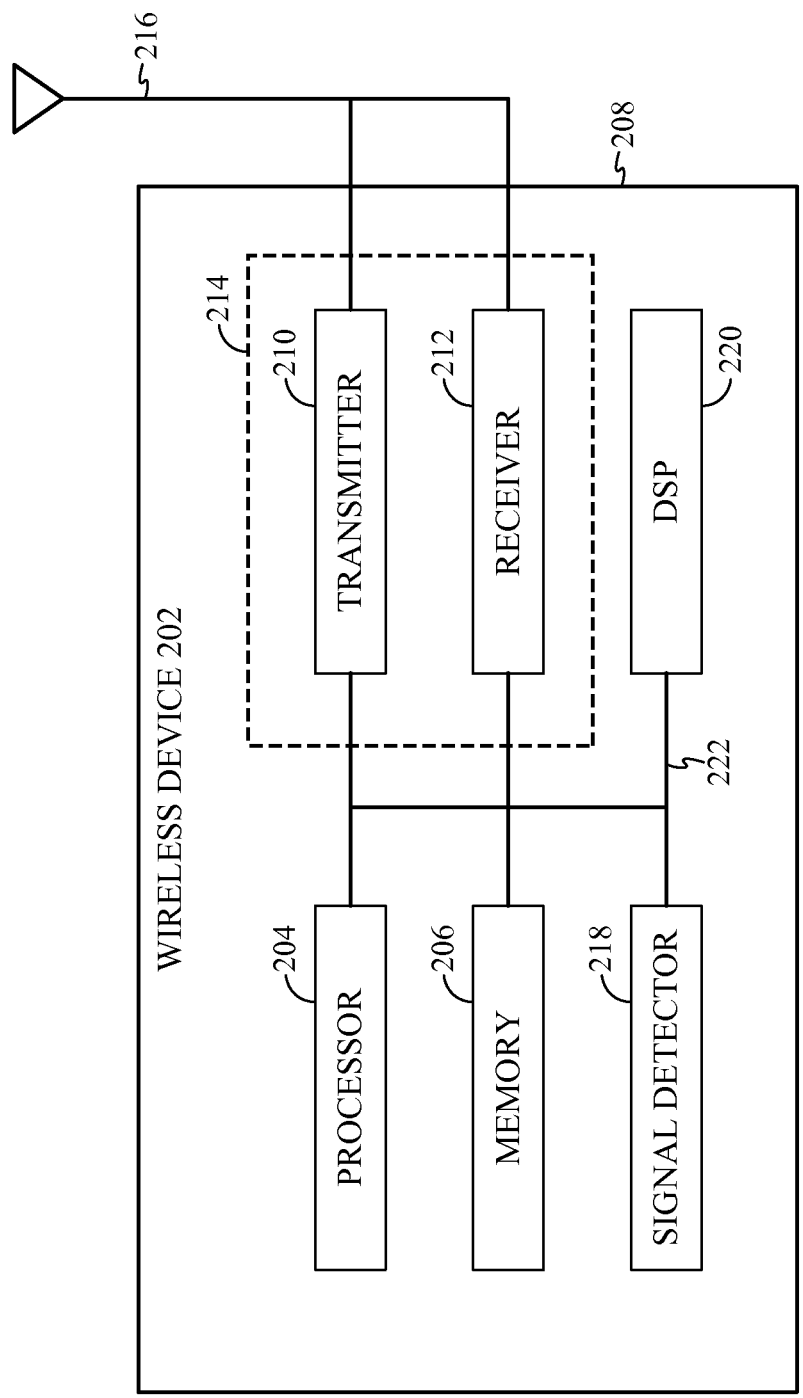
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
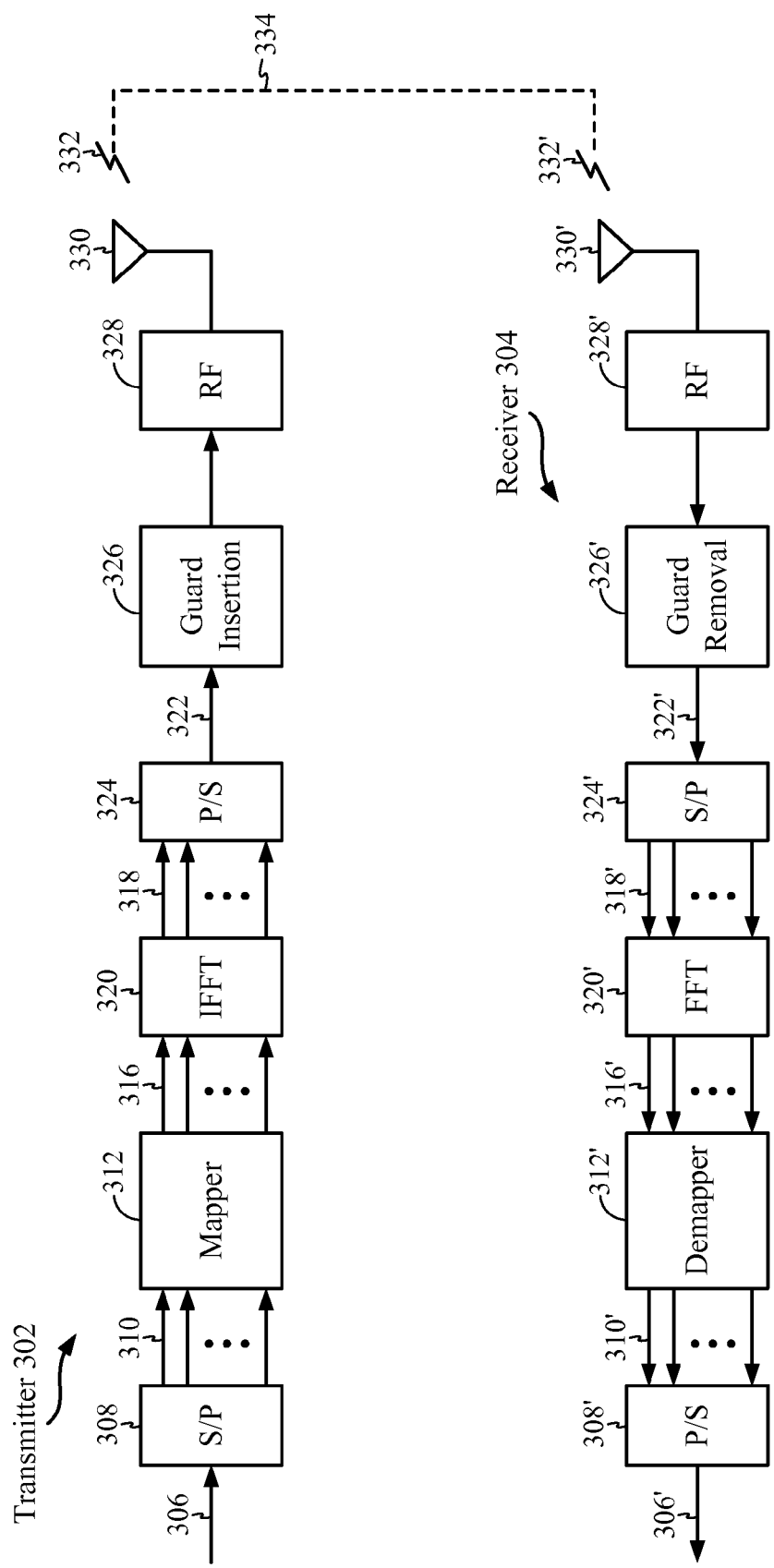
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary Unified Operator, and RAT Mapping and Selection

Certain embodiments of the present disclosure improve performance during a handover between different radio access technologies (RATs) or at system start-up while selecting and connecting to a network. The proposed method translates system determination features from a network using the WiMAX standard to a network which is associated with (i.e., in compliance with or an extended, modified or proprietary that may not be in complete compliance, but is enough in compliance to facilitate this disclosure) one of the 3rd Generation Partnership Project (3GPP) or 3GPP2 family of standards, and vice-versa. For example, a WiMAX NAP (Network Access Provider) parameter may be used as an index to map to an MNC (Mobile Network Code) parameter for selection of a PLMN (Public Land Mobile Network) in a 3GPP network. In addition, the WiMAX NAP may be mapped to a SID/NID (System Identification/Network Identification) parameter for selecting a Preferred Roaming List (PRL) in a 3GPP2 network.

Similarly, an MNC in a 3GPP network or an SID+NID parameter in a 3GPP2 network may be used to determine the value of a NAP parameter in a WiMAX network. By storing the translation/mapping information in the long-term memory of a multi-mode wireless device, for example a multi-mode mobile station (MS), the multi-mode MS may either select a RAT and an operator from the prioritized list automatically or provide a user with a unified user interface that expedites system determination process.

The proposed mapping may also simplify the knowledge representation stored inside the long-term memory of the MS for the co-layered networks. Therefore, when the MS moves outside of the coverage area of a RAT, the MS may use this knowledge to quickly switch to another RAT without going through a time consuming Radio Frequency (RF) spectrum scan process. As a result, using techniques presented herein may reduce time and battery power consumption during the switching process between different RATs or during a system start-up after the mobile station is turned on.

Figure 4:
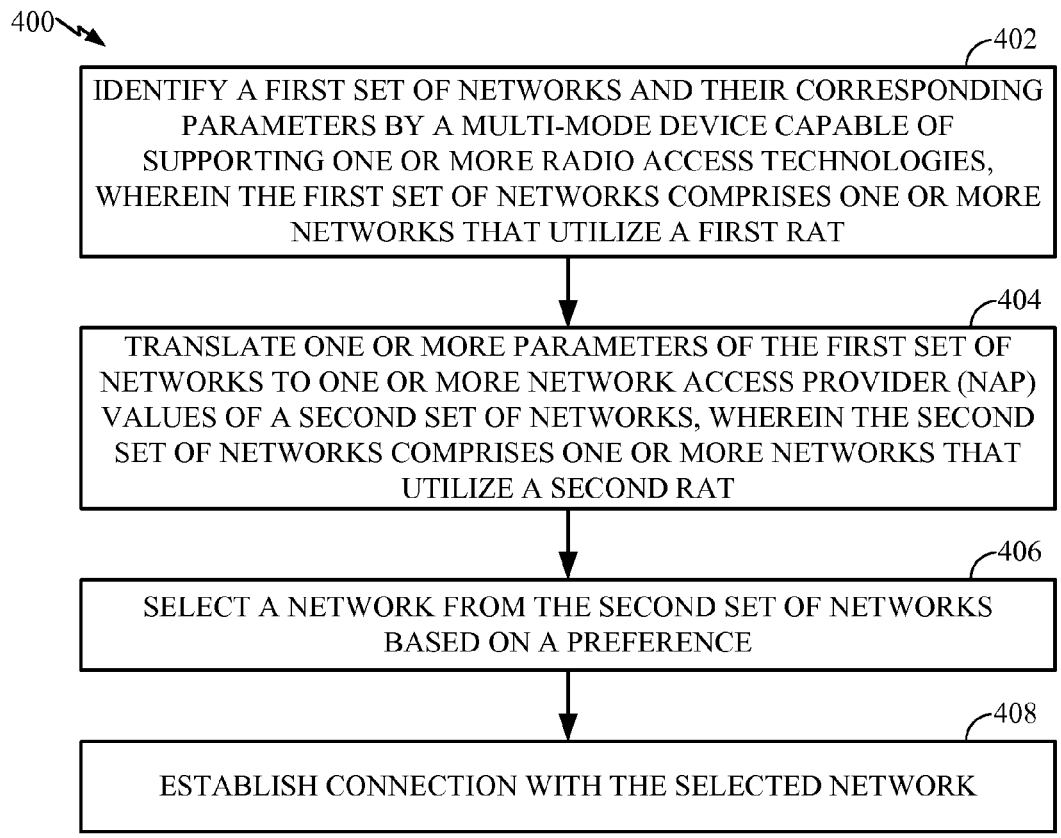
FIG. 4 illustrates example operations that may be performed, for example, by a multi-mode wireless device, for example a multi-mode mobile station or handset, for selecting and establishing a connection to a network, in accordance with certain embodiments of the present disclosure.

FIG. 4 illustrates example operations 400 that may be performed, for example, by a multi-mode MS, for selecting and establishing a connection to a network, in accordance with certain embodiments of the present disclosure. At 402, the MS may identify a first set of networks and their corresponding parameters. The first set of networks may include one or more networks that utilize a first RAT. The network parameters may include names of the network operators, radio access technologies used by each of the operators and so on.

At 404, the MS may translate one or more parameters of the first set of networks to one or more Network Access Provider (NAP) values of a second set of networks. The second set of networks may include one or more networks that utilize a second RAT. For certain embodiments, the translation may be based on a list. The list may be, for example, provided as part of a manufacturing process, system configuration by a vendor, or obtained after sale of an MS. In either case, the parameters may be updated during the life of an MS.

At 406, the MS may select a network from the second set of networks based on, at least in par, a preference, e.g., a preference, a predetermined preference, a network operator preference, or the like. The preference may be stored in the MS or be entered manually using a user interface. At 408, the MS may establish connection to the selected network. For example, the MS may either handover from a first RAT to a second RAT or may establish connection with a RAT after being turned on in a possibly new location.

As an example, when switching from a WiMAX network to a 3GPP or 3GPP2 network, an MS may translate a WiMAX NAP to an MNC in a PLMN for a 3GPP network or to a PRL for a 3GPP2 network. Such a translation may allow the MS to obtain parameters of the new RAT and, switch to the new RAT without having to go through a lengthy RF scan process.

Figure 5:
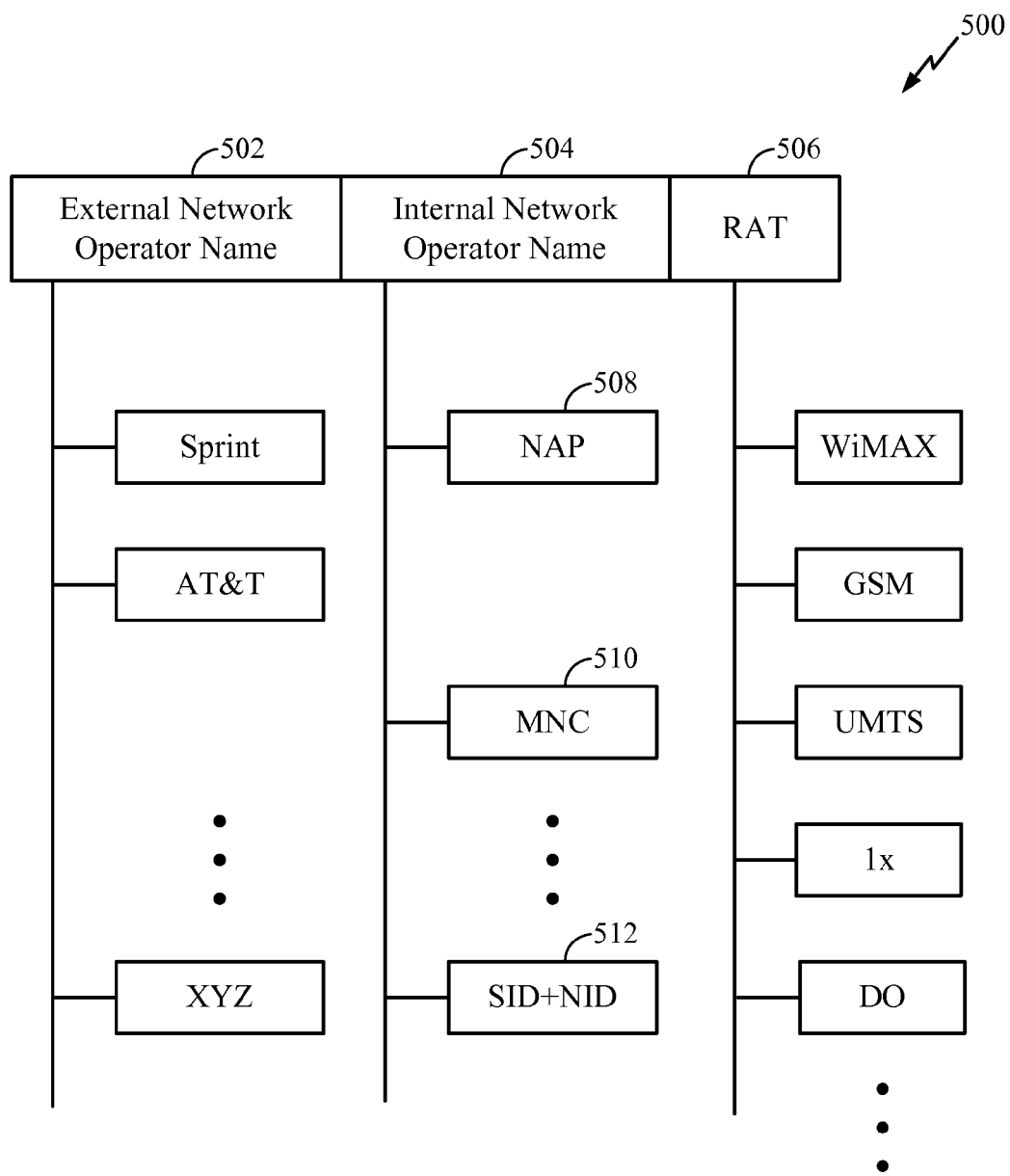
FIG. 5 illustrates a generic format to integrate a plurality of standards and operator names into a joint table format, in accordance with certain embodiments of the present disclosure.

FIG. 5 illustrates a generic format to integrate a plurality of standards and operator names into a joint table format, in accordance with certain embodiments of the present disclosure. For example, the plurality of standards may include 3GPP, 3GPP2, WiMAX, and so on. As illustrated, the table 500 may include fields for an external network operator name 502, an internal network operator name 504 and a RAT 506.

The external network operator 502 name may include, for example, Sprint, AT&T, and name of other network operators. The internal network operator name 504 may include NAP 508 for WiMAX, MNC 510 for 3GPP, SID+NID 512 for 3GPP2, and so on. The RAT field 506 in table 500 may include WiMAX, GSM (Global System for Mobile communications), UMTS (Universal Mobile Telecommunications Service), single carrier (1x), data optimized (DO), and so on. Thus, given a WiMAX NAP parameter, an MS may be able to retrieve 3GPP/3GPP2 information by mapping the NAP value into SID+NID or MNC, allowing for an efficient handover.

Figure 6:
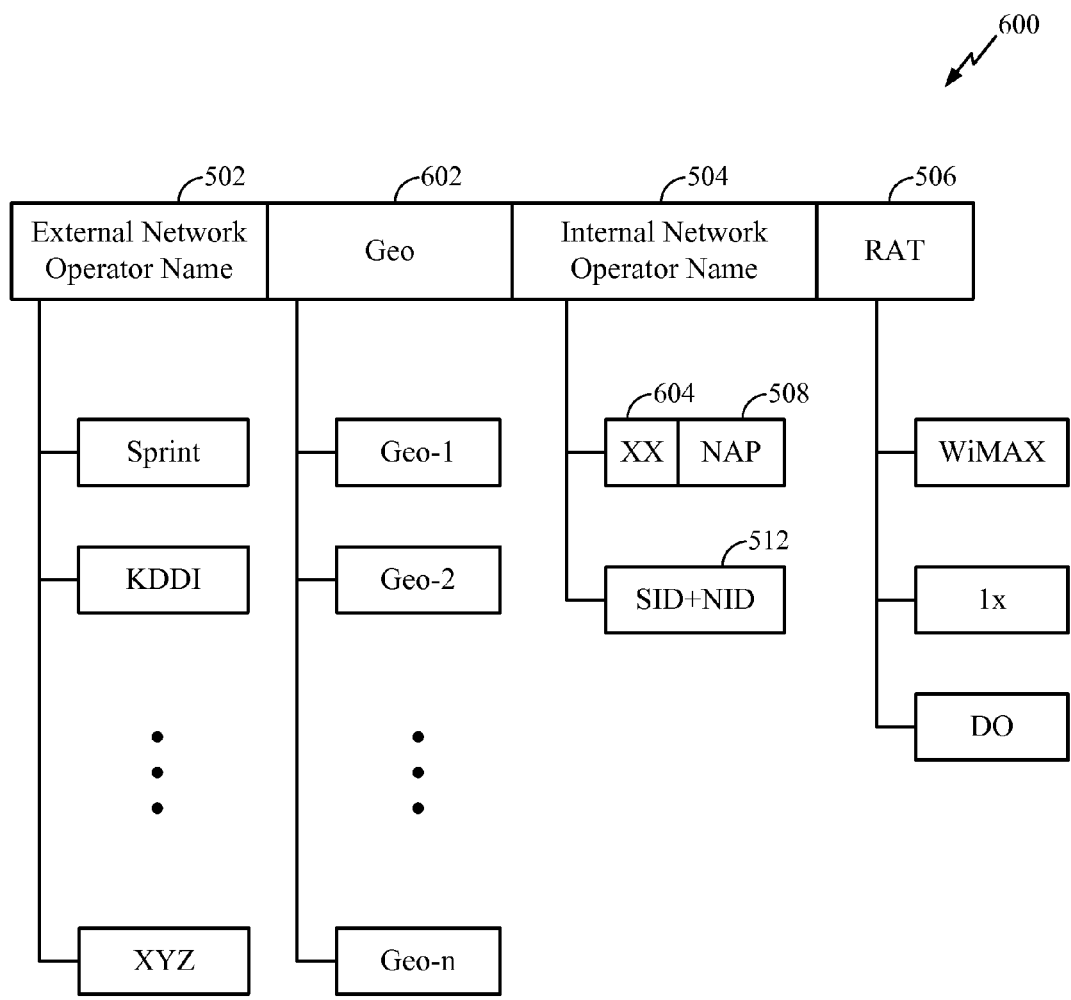
FIG. 6 illustrates an example format for integrating information regarding a Worldwide Interoperability for Microwave Access (WiMAX) network and a 3rd Generation Partnership Project 2 (3GPP2) network, in accordance with certain embodiments of the present disclosure.

FIG. 6 illustrates an example format for integrating information regarding a WiMAX network and a 3GPP2 network, in accordance with certain embodiments of the present disclosure. For example, the WiMAX NAP information may be translated into a PRL for a 3GPP2 network. A 3GPP2 network may use a PRL to manage different operators and RATs. A PRL may have three major components: GEO 602 (which indicates a geographical area in which a particular system is deployed), SID/NID 512, and RAT 506.

In WiMAX, there is typically no standardized support of a geographical area concept. However, the WiMAX NAP 508 may be translated to the SID/NID 512 in 3GPP2 network. The NAP 508 and SID/NID 512 both uniquely identify a network. However, one difference between the NAP and the SID/NID may be that the NAP 508 may be 24 bits while the SID/NID 512 may be 31 bits. Thus, for certain embodiments, when translating NAP information 508 into the SID/NID 512, the 24 bits of NAP information may be converted into 31 bits of SID/NID information. For example, as shown in FIG. 6, a "don't care" sequence 604 of length 7 bits may be appended to the NAP information to generate a 31-bit format similar to the SID/NID information.

By utilizing this approach, in order to select a WiMAX NAP 508, a PRL selection scheme may be used, along with features associated with the PRL selection, such as the GEO feature, to expedite the local search process for WiMAX NAP 508 and allow an MS to quickly find a WiMAX cell. For example, certain SID/NIDs may be associated with a particular geographic area (GEO). Thus, when an MS is located at (or reaches) a specific GEO, a filtered SID/NID list associated with that GEO may be derived. The user may then be given a choice among the elements inside the filtered SID/NID list to expedite the operator and cell selection process for WiMAX. Since the NAP can be converted to the SID/NID through the above translation, information about the WiMAX operator may also be found through the GEO-based selection scheme.

Figure 7:
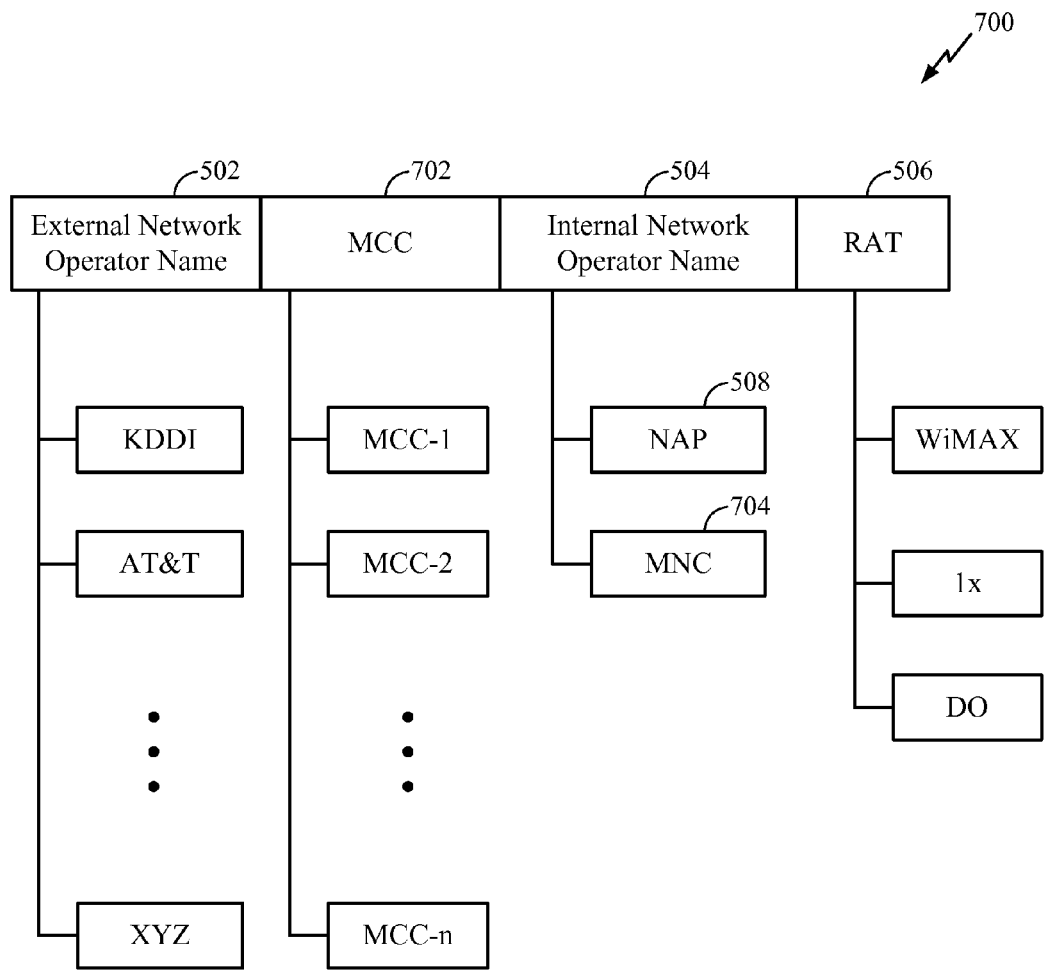
FIG. 7 illustrates an example format for integrating information regarding a WiMAX network and a 3GPP network, in accordance with certain embodiments of the present disclosure.

FIG. 7 illustrates an example format 700 for integrating information about a WiMAX network and a 3GPP network, in accordance with certain embodiments of the present disclosure. For example, the WiMAX NAP information may be integrated into a PLMN list for a 3GPP network. A device working under a 3GPP standard may utilize a PLMN list to manage different operators and RATs. As illustrated, A PLMN list may have three major components: MCC (Mobile Country Code) 702, MNC 704, and RAT 506.

In the WiMAX standard, there is no concept of a mobile country code. However, the WiMAX NAP 508 is equivalent to the PLMN MNC 704. Specifically, both the NAP 508 and the MNC 704 are 24 bits. Therefore, a NAP may easily be mapped to an MNC. By using this mapping, WiMAX NAP 508 selection may be performed by a mechanism similar to the PLMN selection, along with associated features such as the MCC 702. Therefore the search process for a local WiMAX NAP 508 may be expedited by utilizing the geographical information in the MCC 702 allowing an MS to quickly find a WiMAX cell.

In addition, in 3GPP standards, extra variables, such as HPLMN (Home PLMN), VPLMN (Visiting PLMN), and RPLMN (Registered PLMN) are defined. The HPLMN represents the most frequently used PLMN by an MS, the VPLMN represents the visiting PLMN that an MS plans to use, and the RPLMN represents the last PLMN registered before an MS is powered down.

For certain embodiments, an MS utilizing WiMAX may also keep track of the information about the most frequently used networks and utilize this information when selecting/switching between networks. For example, the MS may store the NAP values corresponding to the most frequently used operators in WiMAX networks in a HPLMN variable. The new HPLMN variable may have multiple entries, each of which may use a different RAT, that are sorted based on their priorities. Thus, when the MS encounters an out-of-service problem, the MS may choose one of the RATs specified in the HPLMN for a handover.

In some cases, an MS utilizing WiMAX may move to a different location. For example, a mobile user may take a flight to a different city covered by a different network operator and possibly a different RAT. For certain embodiments, before the mobile user arrives at the new location, the mobile user may specify a prioritized list of RATs that will be available in the new location in a variable similar to a VPLMN. Thus, when the mobile user arrives at the new location and encounters an out-of-service problem, the MS may trigger a search for a new service based upon the priority and preference specified inside the VPLMN variable, rather than blindly search for the RF spectrum. By doing this, the mobile user can quickly find and establish connection with a new wireless network using a RAT operated by a network access operator in the new location.

For certain embodiments, an MS utilizing WiMAX may keep a record of the last NAP used before powering down. For example, an NAP corresponding to the last network that the MS was connected to before being turned off may be stored in a variable similar to the RPLMN, which then may be stored automatically into the long term memory of the MS. In this way, when the MS is powered back up, the MS may simply reconnect to the network as specified by the stored value.

Figure 8:
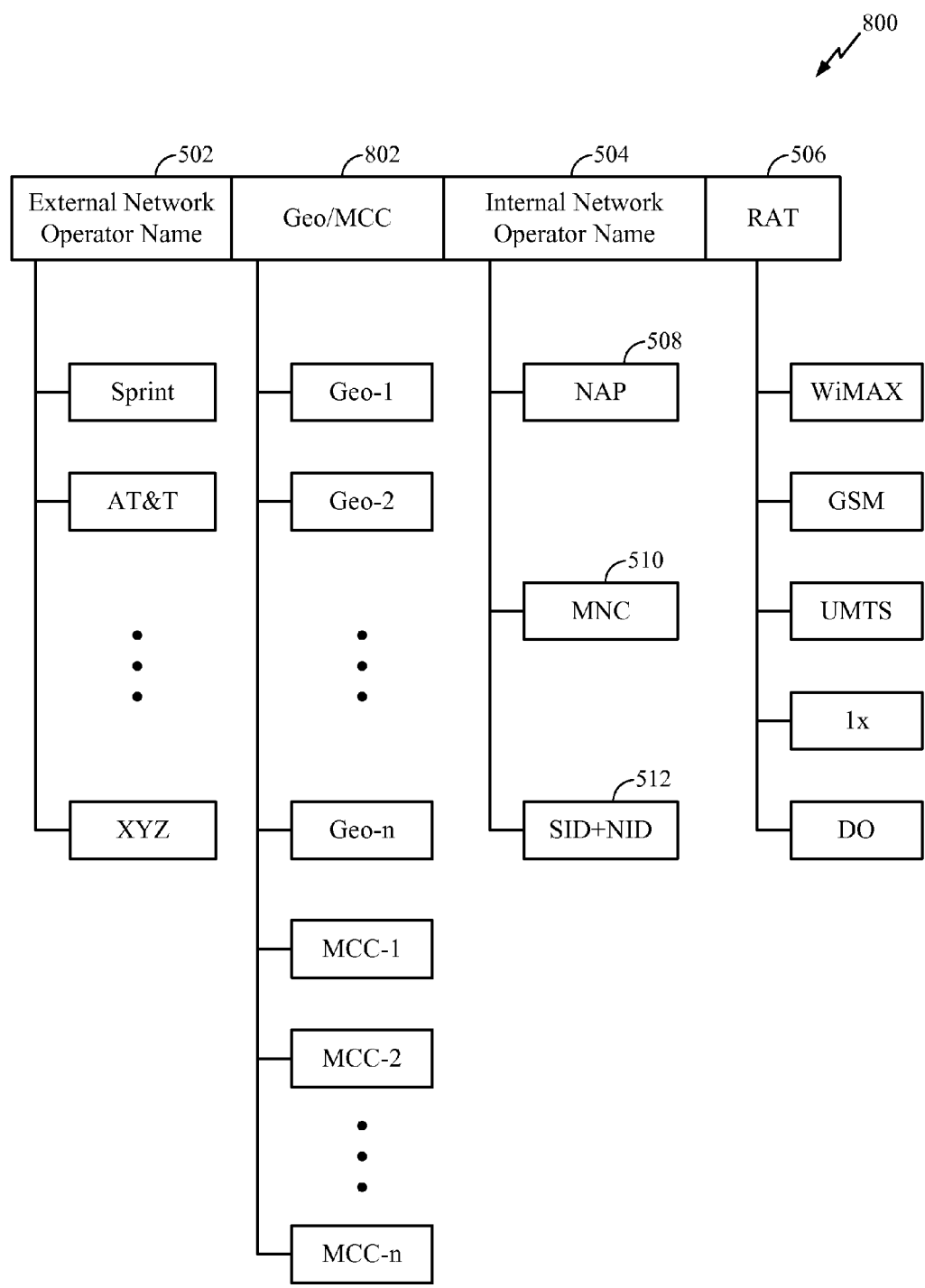
FIG. 8 illustrates a generalized list containing information from a plurality of standards, in accordance with certain embodiments of the present disclosure.

FIG. 8 illustrates a generalized list containing information from a plurality of standards such as 3GPP, 3GPP2 and WiMAX, in accordance with certain embodiments of the present disclosure. As discussed above, the WiMAX NAP information may be mapped to a PRL for a device utilizing 3GPP2 or a PLMN list for a device utilizing 3GPP device. For certain embodiments, WiMAX NAP information, a PLMN list and a PRL list may be merged together to form a generalized list, as shown in FIG. 8. This list is similar to the lists in FIGS. 6 and 7, with the difference that the 3GPP2's GEO field 602 is correlated with the 3GPP's MCC field 702 to generate a GEO/MCC field 802.

Some network operators (e.g., AT&T, Sprint, etc.) may use a different identification code depending on the RAT used. For example, the MNC code specified for an operator using 3GPP may differ from the SID/NID code for the same operator when using 3GPP2. Likewise, the MNC code and/or the SID/NID code may differ from the NAP specified for the operator when using WiMAX. For certain embodiments, when using a preferred operator list, the external name and internal operator code mapping may be resolved through a "1 to m" mapping to create a unified operator list. In other words, the external name for an operator may have m internal operator codes associated with it.

In some cases, an MS may not have any knowledge about the local RAT or the parameters for one or more RATs supported in a particular area. For certain embodiments, when an MS arrives at a new location operated by an unknown RAT and unknown network access operator, the MS may use a preferred RAT and preferred operator from the joint table 800 as shown in FIG. 8 to find a wireless network which results in a better service or lower billing costs. This may be done during the system startup and determination process.

For certain embodiments, mobile users may specify the priority of the RAT and priority of network access operator. The priority may be designated by the order in which the network access operators and RATs are sorted in the table 800. For example, the entry appearing first (e.g., Sprint) may have the highest priority and the entry appearing last (e.g., XYZ) may have the lowest priority. As a result, when an MS encounters an out-of-service problem, the MS may start to search for a new RAT using the preferred order. If more than one operator utilizes a RAT, a preferred frequency band of an operator may be used to start the initial network entry procedure.

For certain embodiments, the WiMAX NAP information may be integrated into a PRL or a PLMN list automatically. Network operators continue to deploy WiMAX networks in many areas, thus not all of the NAP and region information can be included into the consolidated PRL or PLMN list (e.g., FIG. 8). For certain embodiments, when an MS encounters an out-of-service problem and discovers a new WiMAX network through a given 3GPP's MCC value or 3GPP2's GEO value, list inside the MS may be updated by inclusion of the new WiMAX NAP into the current choices in the MNC list of a PLMN or the current choices of the GEO variable in a PRL.

A mobile station utilizing WiMAX may use an NAP and an NSP (Network Service Provider) to identify a network. However, the NSP is generally considered a sub-domain concept that is not used by 3GPP or 3GPP2 standards. For certain embodiments, when WiMAX is selected, along with an associated NAP value, an NSP value may be selected either manually or automatically. For example, a user interface may be triggered using the NAP as an index to display a filtered NSP list to a user. The user may then select one of the NSPs manually. In an automatic selection process, the NSP having the highest priority (as specified by the user or the system) may be chosen automatically after a NAP is selected.

It should be noted that many short-range wireless communication protocols, such as the IEEE 802.11 (WiFi), Bluetooth, and the like, may also be integrated in the tables such as the table in FIG. 8 and supported by the proposed unified operator and RAT mapping and selection scheme.

Advantageously, as described herein, embodiments of the disclosure may provide a unified scheme which simplifies the co-layered multi-RAT operator and RAT selection process. It also resolves the problem of an operator using different codes for different RATs. Embodiments of the disclosure may also provide various options to prioritize a particular RAT or operator during the system determination process.

Further, by using the proposed unified operator list with RAT technology information, HPLMN, VPLMN, and RPLMN features used in 3GPP may be reused in WiMAX networks to help the co-layered network RAT and operator selection/or switching between WiMAX and 3GPP systems. Such proposed unified operator lists with RAT technology information may also enable reuse of the GEO features of 3GPP2 in WiMAX networks to help co-layered network RAT and operator selection/switching between WiMAX and 3GPP2 systems.

Certain embodiments of the present disclosure may also enable an MS to automatically select a different RAT (e.g., as specified in the HPLMN, VPLMN or RPLMN, or PRL's GEO list) when an MS encounters an out-of-service situation.

Figure 4A:
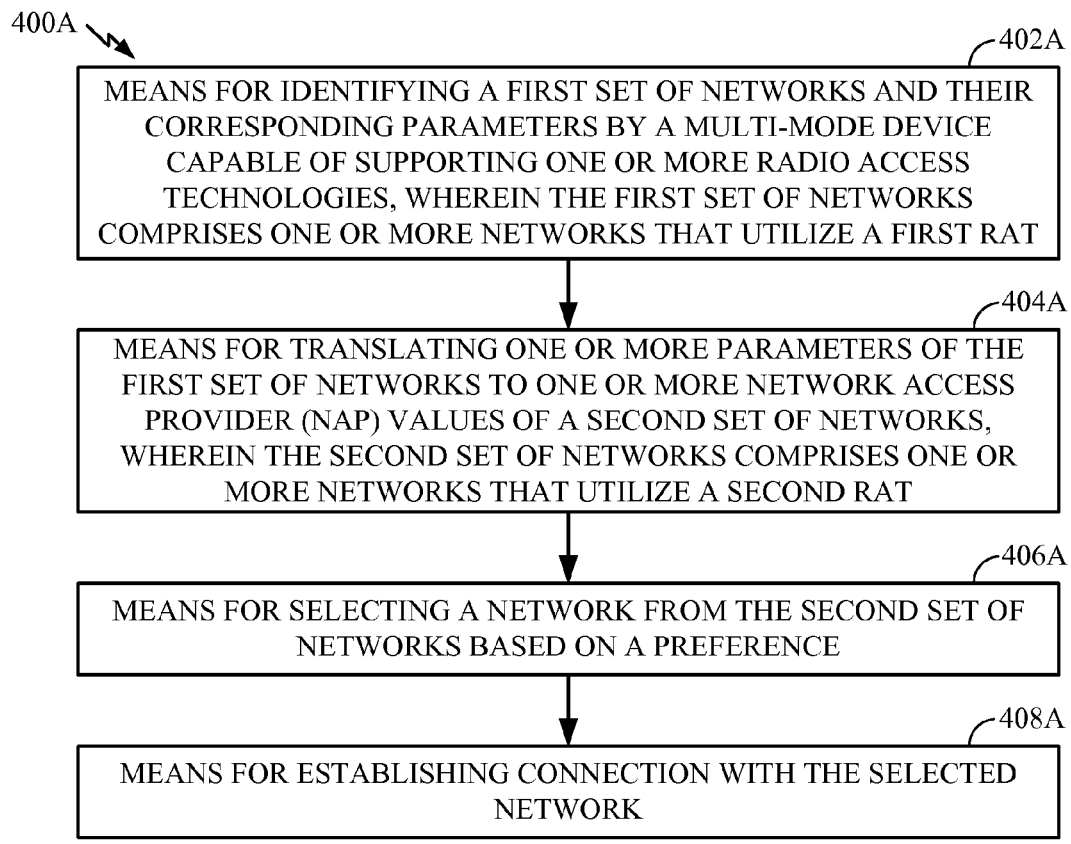
FIG. 4A illustrates example components capable of performing the operations illustrated in FIG. 4.

The various operations of methods described above may be performed by various hardware and/or software component(s) and/or module(s) corresponding to means-plus-function blocks illustrated in the Figures. For example, blocks 402-408 illustrated in FIG. 4 correspond to means-plus-function blocks 402A-408A illustrated in FIG. 4A. More generally, where there are methods illustrated in Figures having corresponding counterpart means-plus-function Figures, the operation blocks correspond to means-plus-function blocks with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits (i.e., logic) described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium or memory device that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium or memory device. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method of wireless communications by a wireless device configured to communicate via a plurality of radio access technologies (RATs) including a first RAT and a second different RAT, comprising:
    translating system determination features of a first set of networks utilizing the first RAT to system determination features of a second set of networks utilizing the second RAT, wherein the system determination features of the second set of networks include a geographic feature based on a geographic location, wherein the geographic feature lacks standardized support in the first set of networks;
    deriving a filtered list of the translated system determination features of the first set of networks based on a value of the geographic feature of the second set of networks, wherein the geographic feature of the second set of networks is a geographic area (GEO) feature or a Mobile Country Code (MCC) feature;
    selecting a network of the first set of networks based at least in part on the translated system determination features; and
    initiating a connection process with the selected network.

2. The method of claim 1, wherein the system determination features of the second set of networks include at least one item selected from a group consisting of: an external network operator name, an internal network operator name, a radio access technology, and information about geographical area.

3. The method of claim 1, wherein:
    the first RAT is associated with the Worldwide Interoperability for Microwave Access (WiMAX) family of standards and the second different RAT is associated with one of the 3rd Generation Partnership Project (3GPP) family of standards, and
    wherein the system determination features of the first set of networks comprise Network Access Provider (NAP) values and the system determination features of the second set of networks comprise Mobile Network Code (MNC), wherein the geographic feature lacking standardized support in the first set of networks comprises a mobile country code (MCC) feature, and wherein deriving the filtered list comprises filtering the translated MNC parameters using a MCC feature value.

4. The method of claim 1, wherein:
the first RAT is associated with the WiMAX family of standards, the second RAT is associated with one of the 3rd Generation Partnership Project 2 (3GPP2) family of standards, and
wherein the system determination features of the first set of networks comprise NAP values and the system determination features of the second set of networks comprise System Identification (SID) and Network Identification (NID) parameters, wherein the geographic feature lacking standardized support in the first set of networks comprises a GEO feature, and wherein deriving the filtered list comprises filtering the translated SID and NID parameters using a GEO feature value.

5. The method of claim 1, wherein the translating further comprises:
integrating at least one system determination feature of the first set of networks into a list associated with the second set of networks, wherein the list comprises system determination features of the first set of networks including network identification parameters and an order of preference among a plurality of identified networks, to create a joint table combining system determination features of the first set of networks and system determination features of the second set of networks; and
wherein selecting the network of the first set of networks comprises selecting a network of the first set of networks based at least in part on the joint table; and
wherein the first RAT is associated with the Worldwide Interoperability for Microwave Access (WiMAX) family of standards.

6. The method of claim 5, wherein the list is one of a Preferred Roaming List (PRL) associated with one of the 3rd Generation Partnership Project 2 (3GPP2) family of standards, or a Public Land Mobile Network (PLMN) list associated with one of the 3rd Generation Partnership Project (3GPP) family of standards.

7. The method of claim 5, further comprising automatically adding system determination features of newly discovered WiMAX networks to the joint table.

8. An apparatus for wireless communications by a multi-mode wireless device configured to communicate via a plurality of radio access technologies (RATs) including a first RAT and a second different RAT, comprising:
means for translating system determination features of a first set of networks utilizing the first RAT to system determination features of a second set of networks utilizing the second RAT, wherein the system determination features of the second set of networks include a geographic feature based on a geographic location, wherein the geographic feature lacks standardized support in the first set of networks;
means for deriving a filtered list of the set of translated system determination features of the first set of networks based on a value of the geographic feature of the second set of networks, wherein the geographic feature of the second set of networks is a geographic area (GEO) feature or a Mobile Country Code (MCC) feature;
means for selecting a network of the first set of networks based at least in part on the translated system determination features; and
means for initiating a connection process with the selected network.

9. The apparatus of claim 8, wherein the system determination features of the second set of networks include at least one item selected from a group consisting of: an external network operator name, an internal network operator name, a radio access technology, and information about geographical area.

10. The apparatus of claim 8, wherein:
the first RAT is associated with the Worldwide Interoperability for Microwave Access (WiMAX) family of standards and the second different RAT is associated with one of the 3rd Generation Partnership Project (3GPP) family of standards, and
wherein the system determination features of the first set of networks comprise Network Access Provider (NAP) values and the system determination features of the second set of networks comprise Mobile Network Code (MNC), wherein the geographic feature lacking standardized support in the first set of networks comprises a mobile country code (MCC) feature, and wherein deriving the filtered list comprises filtering the translated MNC parameters using a MCC feature value.

11. The apparatus of claim 8, wherein:
the first RAT is associated with the WiMAX family of standards, the second RAT is associated with one of the 3rd Generation Partnership Project 2 (3GPP2) family of standards, and
wherein the system determination features of the first set of networks comprise NAP values and the system determination features of the second set of networks comprise System Identification (SID) and Network Identification (NID) parameters, wherein the geographic feature lacking standardized support in the first set of networks comprises a GEO feature, and wherein deriving the filtered list comprises filtering the translated SID and NID parameters using a GEO feature value.

12. An apparatus for wireless communications by a multi-mode wireless device configured to communicate via a plurality of radio access technologies (RATs) including a first RAT and a second different RAT, comprising:
logic for translating system determination features of a first set of networks utilizing the first RAT to system determination features of a second set of networks utilizing the second RAT, wherein the system determination features of the second set of networks include a geographic feature based on a geographic location, wherein the geographic feature lacks standardized support in the first set of networks;
logic for deriving a filtered list of the translated system determination features of the first set of networks based on a value of the geographic feature of the second set of networks, wherein the geographic feature of the second set of networks is a geographic area (GEO) feature or a Mobile Country Code (MCC) feature;
logic for selecting a network of the first set of networks based at least in part on the translated system determination features; and
logic for initiating a connection process with the selected network.

13. The apparatus of claim 12, wherein the system determination features of the second set of networks include at least one item selected from a group consisting of: an external network operator name, an internal network operator name, a radio access technology, and information about geographical area.

14. The apparatus of claim 12, wherein:
the first RAT is associated with the Worldwide Interoperability for Microwave Access (WiMAX) family of standards and the second different RAT is associated with one of the 3rd Generation Partnership Project (3GPP) family of standards, and wherein the system determination features of the first set of networks comprise Network Access Provider (NAP) values and the system determination features of the second set of networks comprise Mobile Network Code (MNC), wherein the geographic feature lacking standardized support in the first set of networks comprises a mobile country code (MCC) feature, and wherein deriving the filtered list comprises filtering the translated MNC parameters using a MCC feature value.

15. The apparatus of claim 12, wherein:
the first RAT is associated with the WiMAX family of standards, the second RAT is associated with one of the 3rd Generation Partnership Project 2 (3GPP2) family of standards, and
wherein the system determination features of the first set of networks comprise NAP values and the system determination features of the second set of networks comprise System Identification (SID) and Network Identification (NID) parameters, wherein the geographic feature lacking standardized support in the first set of networks comprises a GEO feature, and wherein deriving the filtered list comprises filtering the translated SID and NID parameters using a GEO feature value.

16. A computer-program product for wireless communications by a multi-mode wireless device configured to communicate via a plurality of radio access technologies (RATs) including a first RAT and a second different RAT, comprising a memory device having instructions stored thereon, the instructions being executable by one or more processors and the instructions comprising:
instructions for translating system determination features of a first set of networks utilizing the first RAT to system determination features of a second set of networks utilizing the second RAT, wherein the system determination features of the second set of networks include a geographic feature based on a geographic location, wherein the geographic feature lacks standardized support in the first set of networks;
instructions for deriving a filtered list of the translated system determination features of the first set of networks based on a value of the geographic feature of the second set of networks, wherein the geographic feature of the second set of networks is a geographic area (GEO) feature or a Mobile Country Code (MCC) feature;
instructions for selecting a network of the first set of networks based at least in part on the translated system determination features; and
instructions for initiating a connection process with the selected network.

17. The computer-program product of claim 16, wherein the system determination features of the second set of networks include at least one item selected from a group consisting of: an external network operator name, an internal network operator name, a radio access technology, and information about geographical area.

18. The computer-program product of claim 16, wherein:
the first RAT is associated with the Worldwide Interoperability for Microwave Access (WiMAX) family of standards and the second different RAT is associated with one of the 3rd Generation Partnership Project (3GPP) family of standards, and
wherein the system determination features of the first set of networks comprise Network Access Provider (NAP) values and the system determination features of the second set of networks comprise Mobile Network Code (MNC), wherein the geographic feature lacking standardized support in the first set of networks comprises a mobile country code (MCC) feature, and wherein deriving the filtered list comprises filtering the translated MNC parameters using a MCC feature value.

19. The computer-program product of claim 16, wherein:
the first RAT is associated with the WiMAX family of standards, the second RAT is associated with one of the 3rd Generation Partnership Project 2 (3GPP2) family of standards, and
wherein the system determination features of the first set of networks comprise NAP values and the system determination features of the second set of networks comprise System Identification (SID) and Network Identification (NID) parameters, wherein the geographic feature lacking standardized support in the first set of networks comprises a GEO feature, and wherein deriving the filtered list comprises filtering the translated SID and NID parameters using a GEO feature value.

* * * * *